(12) United States Patent
Fujita

(10) Patent No.: US 9,090,124 B2
(45) Date of Patent: Jul. 28, 2015

(54) BICYCLE HUB AXLE ADAPTER

(75) Inventor: Hiroshi Fujita, Osaka (JP)

(73) Assignee: Shimano Inc., Osaka (JP)

( * ) Notice: Subject to any disclaimer, the term of this patent is extended or adjusted under 35 U.S.C. 154(b) by 376 days.

(21) Appl. No.: 13/608,175

(22) Filed: Sep. 10, 2012

(65) Prior Publication Data

US 2013/0229048 A1    Sep. 5, 2013

(30) Foreign Application Priority Data

Mar. 5, 2012    (TW) .............................. 101114146 A

(51) Int. Cl.
*B60B 27/02*        (2006.01)
*B60B 35/00*       (2006.01)

(52) U.S. Cl.
CPC ............. *B60B 27/026* (2013.01); *B60B 27/02* (2013.01); *B60B 35/00* (2013.01); *B60B 27/023* (2013.01)

(58) Field of Classification Search
CPC .... B60B 27/02; B60B 27/023; B60B 27/026; B60B 35/00
USPC .................. 301/110.5, 124.2, 124.1
See application file for complete search history.

(56) References Cited

U.S. PATENT DOCUMENTS

| | | | |
|---|---|---|---|
| 5,909,931 A * | 6/1999 | Tabe | 301/110.5 |
| 7,360,952 B2 * | 4/2008 | Kanehisa et al. | 384/545 |
| 7,556,321 B2 * | 7/2009 | Hara et al. | 301/124.2 |
| 7,562,941 B2 | 7/2009 | Kanehisa | |
| 7,648,211 B2 * | 1/2010 | Watarai | 301/110.5 |
| 7,669,871 B2 | 3/2010 | Watarai | |
| 8,042,881 B2 * | 10/2011 | Inoue et al. | 301/124.2 |
| 8,485,335 B2 * | 7/2013 | Schlanger | 192/64 |
| 2002/0067069 A1 * | 6/2002 | Kanehisa et al. | 301/110.5 |
| 2004/0169418 A1 * | 9/2004 | Kanehisa et al. | 301/124.2 |
| 2006/0112780 A1 * | 6/2006 | Shiraishi et al. | 74/594.1 |
| 2007/0098316 A1 * | 5/2007 | Kanehisa et al. | 384/545 |
| 2008/0197602 A1 * | 8/2008 | Watarai | 280/281.1 |
| 2009/0072613 A1 * | 3/2009 | Inoue et al. | 301/132 |
| 2009/0115241 A1 * | 5/2009 | Kanehisa | 301/124.2 |
| 2010/0096912 A1 * | 4/2010 | Lude | 301/110.5 |
| 2011/0049968 A1 * | 3/2011 | Jones et al. | 301/124.2 |
| 2011/0278912 A1 * | 11/2011 | Schlanger | 301/124.2 |
| 2011/0309671 A1 * | 12/2011 | Achenbach | 301/124.2 |

FOREIGN PATENT DOCUMENTS

| | | | |
|---|---|---|---|
| DE | 10 2008 043 354 A1 | 5/2009 | |
| DE | 10 2008 012 573 A1 | 6/2009 | |

OTHER PUBLICATIONS

Kun Teng Industry Co., Ltd.; Hub Components Catalog 2012; Taipei, Taiwan; Mar. 2011.
American Classic; MTB Disc 15mm Thru-Axle Retrofit.

* cited by examiner

*Primary Examiner* — Kip T Kotter
*Assistant Examiner* — Scott A Browne
(74) *Attorney, Agent, or Firm* — Global IP Counselors

(57) ABSTRACT

A bicycle hub axle adapter basically includes a hub axle adapter main body and at least one retaining member. The hub axle adapter main body is configured to be inserted into a bicycle hub having a hollow hub axle. The at least one retaining member is disposed on an external surface of the hub axle adapter main body for contacting an internal surface of the hollow hub axle.

16 Claims, 5 Drawing Sheets

BICYCLE HUB AXLE ADAPTER

CROSS-REFERENCE TO RELATED APPLICATIONS

This application claims priority under 35 U.S.C. §119 to Taiwanese Patent Application No. 101114146, filed Mar. 5, 2012. The entire disclosure of Taiwanese Patent Application No. 101114146 is hereby incorporated herein by reference.

BACKGROUND

1. Field of the Invention

This invention generally relates to a bicycle hub axle adapter that is configured to be inserted into a bicycle hub having a hollow hub axle.

2. Background Information

In the case of mountain bikes and other bicycles that travel on rough terrain, a hub axle with a large diameter is sometimes used to increase the rigidity of the hub. Many users of such bicycles prefer a quick release mechanism for removing and changing wheels. Also different bicycles have different specialized quick release mechanisms. However, since the skewer shaft of a conventional quick release mechanism is typically small, the conventional quick release mechanism that a user wishes to use is incompatible with a large-diameter hub axle and cannot be installed in the large-diameter hub axle.

A solution to this problem is to use a hub axle adapter inserted into the space between the large diameter hub axle and the skewer shaft of the conventional quick release mechanism. An example of such a hub axle adapter 20 is shown in FIG. 6. This hub axle adapter 20 has a pair of frame contacting sections 20b, a pair of hub axle contacting sections 20c and a recessed section 20e. The frame contacting sections 20b are inserted into dropouts (not shown) provided on a rear end or a front end of the bicycle frame such that it contacts the bicycle frame. The hub axle contacting sections 20c each have an external circumferential surface 20d that contacts an internal peripheral surface of the hub axle. The recessed section 20e is provided to reduce the weight of the hub axle adapter, and is formed between two hub axle contacting sections 20c. The recessed section 20e has a smaller diameter than the hub axle contacting sections 20c. The frame contacting sections 20b, the hub axle contacting sections 20c, and the recessed section 20e are formed as a one-piece integral unit. When viewed along an axial direction of the hub, an insertion hole 20a for inserting the skewer shaft (not shown) is provided in a center portion of the frame contacting sections 20b, the hub axle contacting sections 20c, and the recessed section 20e.

SUMMARY

With the conventional hub axle adapter 20, described above, it is difficult to secure the wheel in the axial direction of the hub because the external circumferential surfaces 20d of the hub axle contacting sections 20c merely make surface contact with the internal surface of the hub axle. Another problem is that the hub axle adapter 20 can rotate relative to the hub axle.

The bicycle hub axle adapter disclosed herein was conceived in view of the problems just explained. One aspect provided by this bicycle hub axle adapter is that it can be fixed with respect to the hub axle.

In view of the state of the known technology, a bicycle hub axle adapter is provided that basically comprises a hub axle adapter main body and at least one retaining member. The hub axle adapter main body is configured to be inserted into a bicycle hub having a hollow hub axle. The at least one retaining member is disposed on an external surface of the hub axle adapter main body for contacting an internal surface of the hollow hub axle.

It is acceptable to provide a holding groove for axially holding the at least one retaining member on the external surface of the hub axle adapter main body.

It is acceptable to provide the retaining member near an end portion of the hub axle adapter main body. Additionally, it is acceptable for the retaining member to be an O-ring made of an elastic material and the O-ring being arranged to be engaged with the holding groove.

It is acceptable to have frame contacting sections for contacting a bicycle frame.

It is also acceptable for the bicycle hub axle adapter to have an insertion hole for passing a skewer shaft through an internal circumference of the hub axle adapter.

With the disclosed bicycle hub axle adapter, it is possible to provide a hub axle adapter that can be fixed with respect to a hollow hub axle of a bicycle hub.

Other objects, features, aspects and advantages of the disclosed bicycle hub axle adapter will become apparent to those skilled in the art from the following detailed description, which, taken in conjunction with the annexed drawings, discloses preferred embodiments of the bicycle hub axle adapter.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1A:
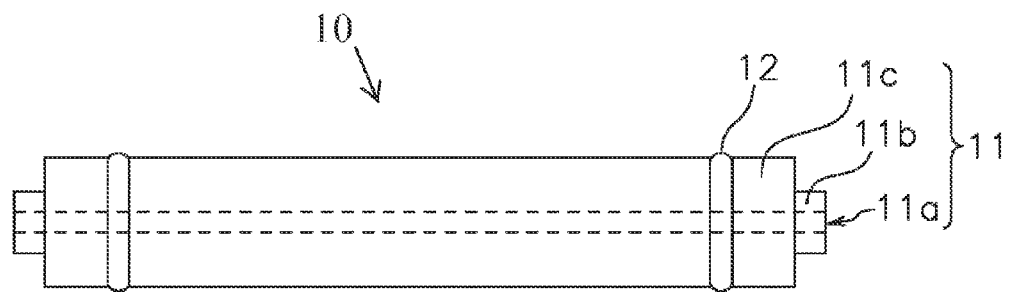
FIG. 1A is a side elevational view of a bicycle hub axle adapter in accordance with one illustrative embodiment.
Figure 1B:
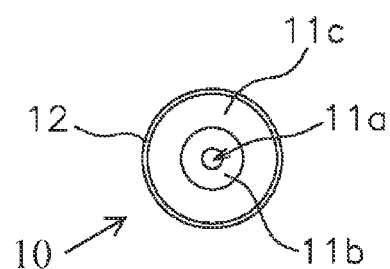
FIG. 1B is an end elevational view of the hub axle adapter illustrated in FIG. 1A as viewed along an axial direction of the hub.

Referring initially to FIGS. 1A and 1B, a bicycle hub axle adapter is illustrated in accordance with a first embodiment. FIG. 1A is a right side elevational view illustrating the bicycle hub axle adapter 10, while FIG. 1B is an end elevational view of the bicycle hub axle adapter 10 as viewed along an axial direction of the bicycle hub axle adapter 10. The hub axle adapter 10 basically comprises a hub axle adapter main body 11 and a pair of retaining members 12.

Figure 2A:
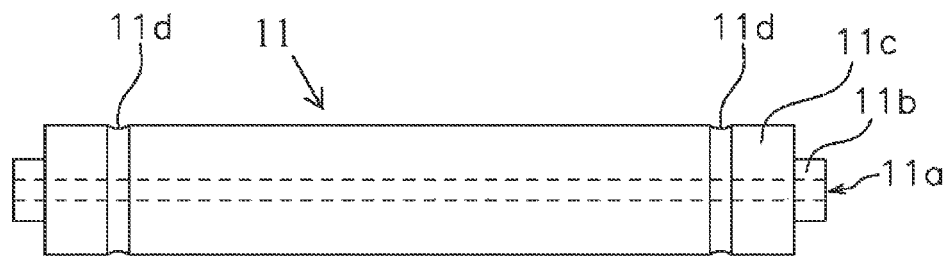
FIG. 2A is a side elevational view of a hub axle adapter main body of the hub axle adapter illustrated in FIGS. 1A and 1B.
Figure 2B:
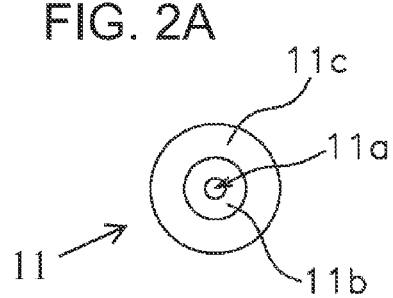
FIG. 2B is an end elevational view of the hub axle adapter main body illustrated in FIG. 2A as viewed along an axial direction of the bicycle hub.

FIG. 2A is a right side elevational view illustrating the hub axle adapter main body 11 with the retaining members 12 removed. FIG. 2B is an end elevational view of the hub axle adapter main body 11 as viewed along an axial direction of the hub. The hub axle adapter main body 11 comprises a pair of frame contacting sections 11b and a hub axle contacting section 11c. The hub axle contacting section 11c has a pair of holding grooves 11d for each receiving one of the retaining members 12. The frame contacting sections 11b, the hub axle contacting section 11c, and the holding grooves 11d are formed as a one-piece integral unit. When viewed along an axial direction of the hub, an insertion hole 11a for inserting a skewer shaft 1b (FIG. 4) is provided in a center portion of the frame contacting sections 11b, the hub axle contacting section 11c and the holding grooves 11d.

The frame contacting sections 11b are inserted into dropouts (not shown) provided on a rear or front end of a bicycle frame such that the frame contacting sections 11b contacts the bicycle frame. Except for the holding grooves 11d, the external peripheral surface of the hub axle contacting section 11c contacts an internal peripheral surface of the hub axle. The holding grooves 11d are grooves that are formed for holding the retaining members 12 as explained later. The holding grooves 11d are preferably formed in the vicinity of first and second axial end portions of the hub axle contacting section 11c near the frame contacting sections 11b. However, it is acceptable to provide a single holding groove 11d at a middle portion, or at other portions other than the end portions. It is also acceptable to provide a single holding groove 11d, or three or more holding grooves 11d.

Each of the retaining members 12 is an O-ring made of an elastic material. The retaining members 12 are held in prescribed positions along the hub axle contacting section 11c by engaging with the holding grooves 11d, respectively. While it is acceptable to provide two retaining members 12 on the hub axle adapter 10 as shown in FIG. 1A, it is preferable for the number of the retaining members 12 on the hub axle adapter 10 to be equal to the number of the holding grooves 11d.

Figure 4:
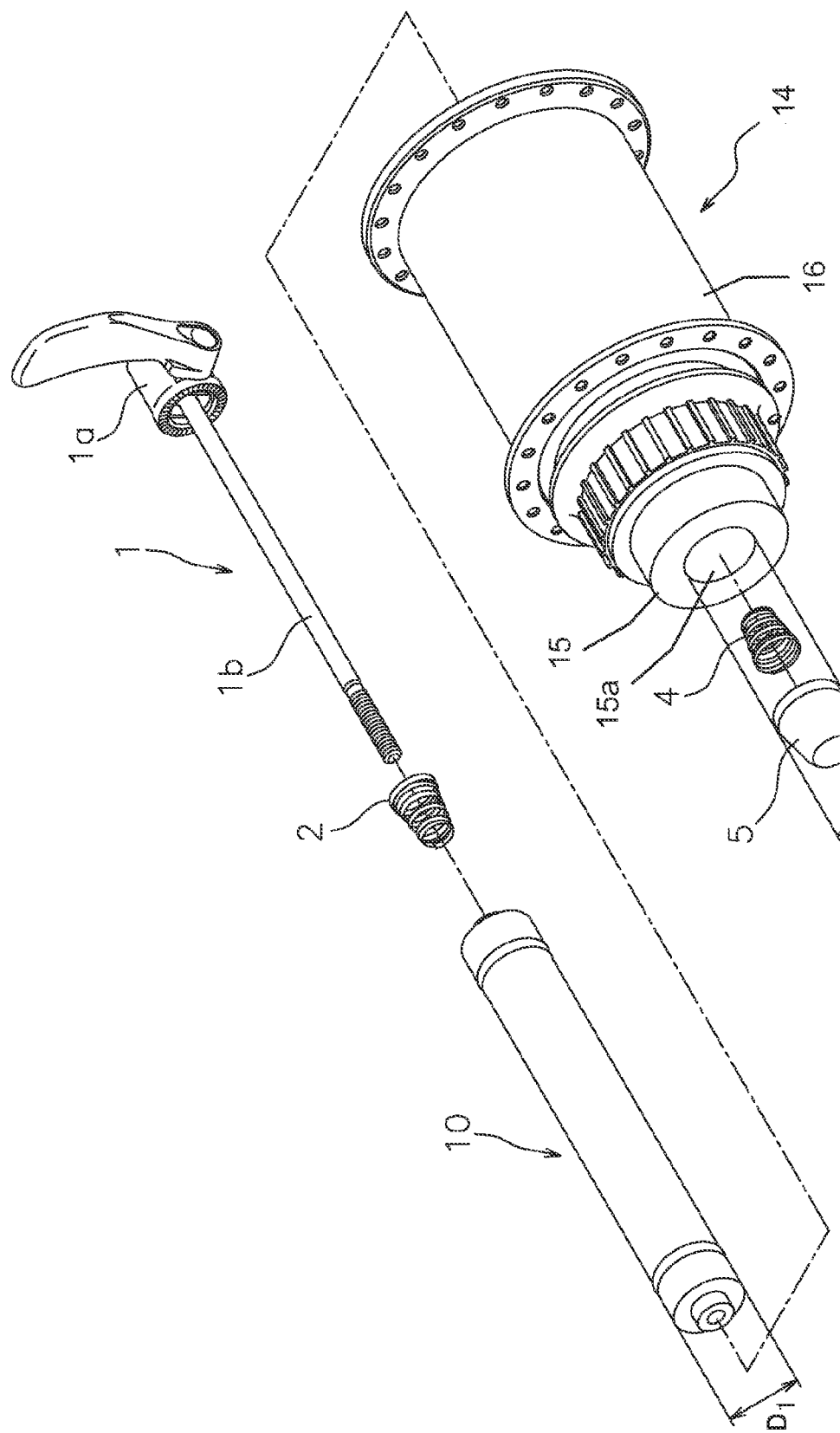
FIG. 4 is an exploded perspective view of a bicycle hub that illustrates a method of installing the bicycle hub axle adapter illustrated in FIGS. 1A and 1B onto a hub axle of the bicycle hub and inserting a skewer shaft having a quick release mechanism into the bicycle hub axle adapter.
Figure 5:
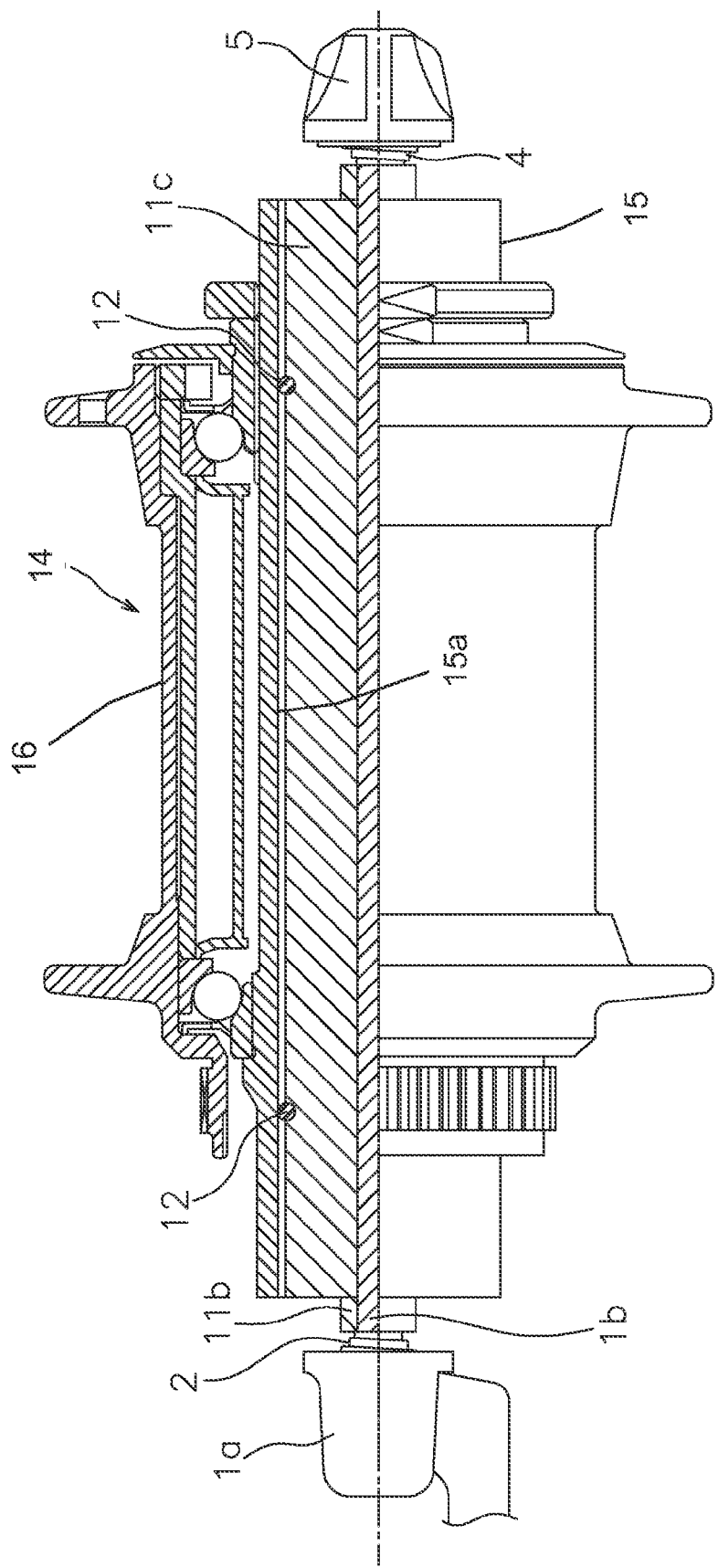
FIG. 5 is a side devotional view of the bicycle hub illustrated in FIG. 4 as viewed when the fastening lever is oriented on the right side of the bicycle hub, in which the bicycle hub axle adapter illustrated in FIGS. 1A and 1B and the quick release mechanism are installed.

The manner in which this hub axle adapter 10 connects to a quick release mechanism and the hub axle will now be explained. FIG. 4 illustrates a method of installing the hub axle adapter 10 onto a hub axle along with a quick release mechanism. FIG. 5 is a side elevational view of a hub in which the hub axle adapter 10 and the quick release mechanism are installed.

The quick release mechanism includes a first portion 1 comprising a fastening lever 1a and a skewer shaft 1b. The quick release mechanism further includes a second portion 5 that is coupled to the first portion 1 by screwing onto a threaded end portion of the skewer shaft 1b. The quick release mechanism further includes a pair of helical springs 2 and 4 that press against the hub axle adapter 10.

The skewer shaft 1b is inserted through the insertion hole 11a of the hub axle adapter 10. The fastening lever 1a and the second portion 5 contact the bicycle frame at a rear end or a front end of the frame. The helical springs 2 and 4 press the frame contacting sections 11b of the hub axle adapter 10 and prevent the hub axle adapter 10 from moving in the axial direction of the hub.

As seen in FIGS. 4 and 5, the hub axle adapter 10 is used with a bicycle hub 14 that basically includes a hollow hub axle 15 and a hub shell 16. The hub shell 16 is rotatably supported on the hollow hub axle 15 by a pair of bearings as seen in FIG. 5. The hub axle adapter 10 is inserted into the hollow hub axle 15 with the helical spring 2 connected to the first portion 1. Then the helical spring 4 is attached to the threaded end portion of the skewer shaft 1b protruding from the hub axle adapter 10 and the second portion 5 is screwed onto the threaded end of the skewer shaft 1b. In this way, the hub axle adapter 10 and the quick release mechanism are installed on the hub.

The hollow hub axle 15 has an internal peripheral surface 15a that is in surface contact with an external peripheral surface of the hub axle adapter 10. In FIG. 5, a gap between the internal peripheral surface 15a of the hollow hub axle 15 and the external peripheral surface of the hub axle adapter 10 has been added for the purposes of illustration. Consequently, the hub axle adapter 10 does not move easily in the axial direction of the hub 14 due to frictional resistance. The internal peripheral surface 15a of the hollow hub axle 15 and the external peripheral surfaces of the retaining members 12 are in surface contact with each other. Additionally, since the retaining members 12 have elasticity in this illustrative example, the frictional resistance can be increased further when the hub axle adapter 10 is inserted into the hollow hub axle 15 and the hub axle adapter 10 is less likely to move in the axial direction of the hub. More particularly, when the wheel is attached and detached, even if the first portion 1 and the second portion 5 are detached from each other, the hub axle adapter 10 will not fall from the hub axle and the position of the hub axle adapter 10 will not shift. As a result, the convenience of a user can be increased.

Figure 3A:
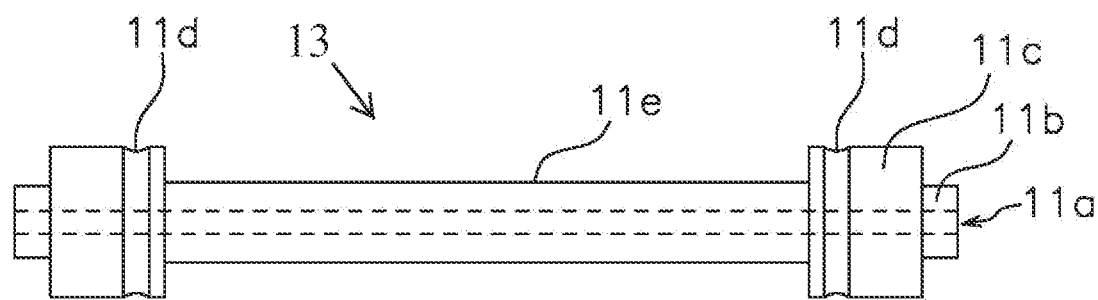
FIG. 3A is a side elevational view of another example of a hub axle adapter main body in accordance with another embodiment.
Figure 3B:
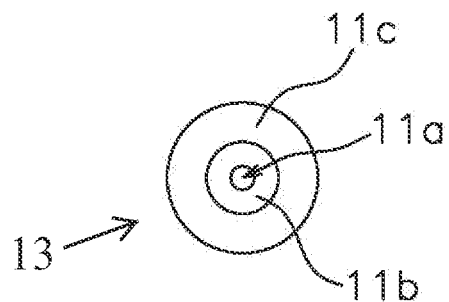
FIG. 3B is an end elevational view of the other example of the hub axle adapter main body according to the present utility model as viewed along an axial direction of the bicycle hub.
Figure 6:
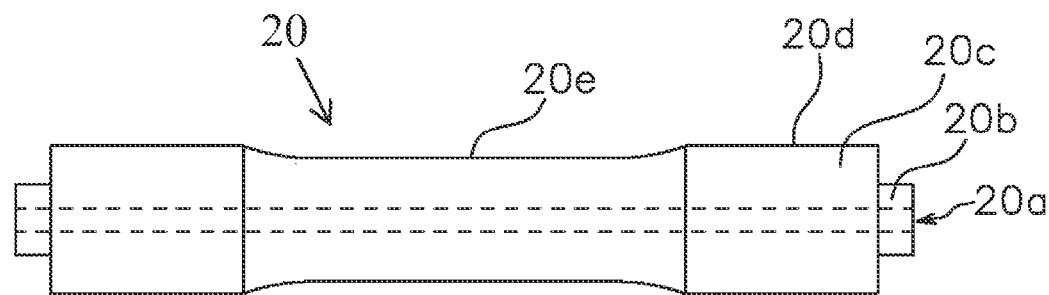
FIG. 6 is a side elevational view of a conventional bicycle hub axle adapter.

As illustrated in FIGS. 1A and 2A, the diameter of the hub axle adapter main body 11 is the constant, except for the holding grooves 11d, but the hub axle adapter is not limited to such a configuration. For example, as illustrated in FIGS. 3A and 3B, a hub axle adapter main body 13 is shown in which a recessed section 11e has been added to the configuration of the hub axle adapter main body 11 illustrated in FIGS. 1A and 2A. This recessed section 11e is provided to reduce weight and it is preferable for the recessed section 11e to be formed in a location slightly separated from the holding grooves 11d. Also, the recessed section 11e shown in FIG. 3A is only one example. In other words, it is acceptable for the recessed section to have another shape, such as a shape that gradually tapers toward a middle portion as shown in FIG. 6.

Furthermore, there are no limitations on the shapes and materials of the hollow hub axle 15 and the quick release mechanism (the first portion 1, the second portion 5, and the helical springs 2 and 4) so long as they accomplish the hub function and the quick release function. It is also acceptable if the quick release mechanism does not have the helical springs 2 and 4.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hub axle adapter comprising:
   a hub axle adapter main body configured to be inserted into a bicycle hub having a hollow hub axle, the hub axle adapter main body having an axially extending insertion hole configured such that a skewer shaft extends there through so at least a distal end portion of the skewer shaft partially protrudes from the axially extending insertion hole; and
   at least one retaining member disposed on an external surface of the hub axle adapter main body for contacting an internal surface of the hollow hub axle.

2. The bicycle hub axle adapter according to claim 1, wherein
   the hub axle adapter main body includes a holding groove axially holding the at least one retaining member on the external surface of the hub axle adapter main body.

3. The bicycle hub axle adapter according to claim 2, wherein
   the at least one retaining member is an O-ring that is made of an elastic material, and the O-ring is retained in the holding groove.

4. The bicycle hub axle adapter according to claim 1, wherein
   the at least one retaining member is an O-ring made of an elastic material.

5. The bicycle hub axle adapter according to claim 1, wherein
   the hub axle adapter main body includes a pair of frame contacting sections for contacting a bicycle frame.

6. A bicycle hub axle adapter comprising:
   a hub axle adapter main body configured to be inserted into a bicycle hub having a hollow hub axle; the hub axle adapter main body having an axially extending insertion hole configured such that a skewer shaft extends therethrough so at least a distal end portion of the skewer shaft partially protrudes from the axially extending insertion hole; and
   at least one retaining member disposed on an external surface of the hub axle adapter main body for contacting an internal surface of the hollow hub axle,
   the at least one retaining member including a first retaining member and a second retaining member, the first retaining member being provided adjacent a first axial end of the hub axle adapter main body, and the second retaining member being provided adjacent a second axial end of the hub axle adapter main body, the first and second axial ends being located on opposite ends of the hub axle adapter main body.

7. The bicycle hub axle adapter according to claim 6, wherein
   the hub axle adapter main body includes a pair of holding grooves that axially holds the first and second retaining members on an external circumference of the hub axle adapter main body.

8. The bicycle hub axle adapter according to claim 7, wherein
   the first and second retaining members are O-rings that are made of an elastic material.

9. A bicycle hub comprising:
   a hollow hub axle;
   a hub shell rotatably supported on the hollow hub axle; and
   a hub axle adapter including a hub axle adapter main body disposed in the hollow hub axle, and a retaining member disposed on an external surface of the hub axle adapter main body and contacting an internal surface of the hollow hub axle,
   the hub axle adapter main body having an axially extending insertion hole configured such that a skewer shaft extends therethrough so at least a distal end portion of the skewer shaft partially protrudes from the axially extending insertion hole.

10. The bicycle hub according to claim 9, wherein
    the hub axle adapter main body includes a holding groove axially holding the at least one retaining member on the external surface of the hub axle adapter main body.

11. The bicycle hub according to claim 10, wherein
    the at least one retaining member is an O-ring that is made of an elastic material, and the O-ring is retained in the holding groove.

12. The bicycle hub according to claim 9, wherein
    the at least one retaining member is an O-ring made of an elastic material.

13. The bicycle hub according to claim 9, wherein
    the at least one retaining member includes a first retaining member and a second retaining member, the first retaining member being provided adjacent a first axial end of the hub axle adapter main body, and the second retaining member being provided adjacent a second axial end of the hub axle adapter main body.

14. The bicycle hub according to claim 13, wherein
    the hub axle adapter main body includes a pair of holding grooves that axially holds the first and second retaining members on an external circumference of the hub axle adapter main body.

15. The bicycle hub according to claim 14, wherein
    the first and second retaining members are O-rings that are made of an elastic material.

16. The bicycle hub according to claim 9, wherein
    the hub axle adapter main body includes a pair of frame contacting sections for contacting a bicycle frame.

* * * * *